Nov. 21, 1950          P. H. SECKEL          2,531,234
LONGITUDINALLY SEPARABLE EXTRUDED THERMOPLASTIC
STRIP AND PROCESS OF PRODUCING SAME
Filed July 21, 1949
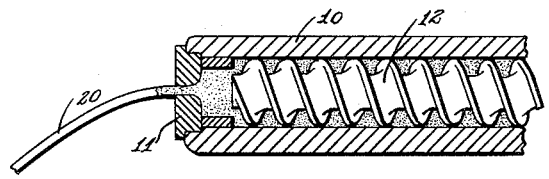
Fig. 1
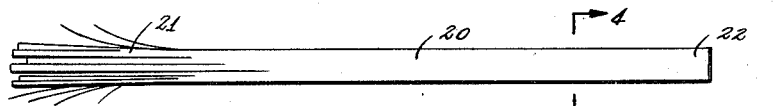 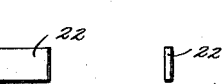
Fig. 2        Fig. 3
Fig. 4
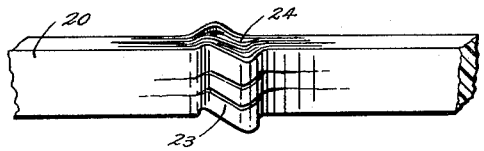
Fig. 5
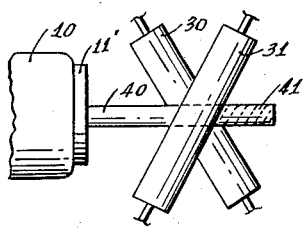 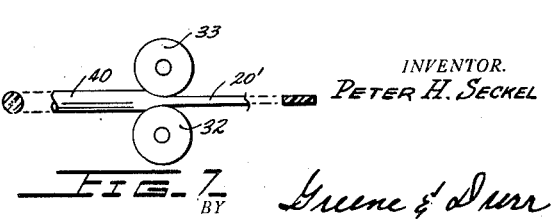
Fig. 6        Fig. 7
INVENTOR.
PETER H. SECKEL
BY Greene & Durr
ATTORNEYS Patented Nov. 21, 1950

2,531,234

UNITED STATES PATENT OFFICE 2,531,234

LONGITUDINALLY SEPARABLE EXTRUDED THERMOPLASTIC STRIP AND PROCESS OF PRODUCING SAME

Peter H. Seckel, New York, N. Y., assignor to Richard A. Fisch, New York, N. Y.

Application July 21, 1949, Serial No. 105,937

7 Claims. (Cl. 18—47.5)

This invention relates to a novel process of making continuously extruded products of plastic material and to the extruded products of plastic material made by the process.

An object of the invention is to provide a length of extruded material which has unusual longitudinal tensile strength and unusual resistance to shear or tearing transversely with respect to the direction of extrusion.

Another object of the invention is to provide a length of extruded material which is easily separable into threads which run parallel to the length of the extruded material.

Another object of the invention is to provide a length of extruded material which is easily separable into threads which run spirally with respect to the length of the extruded material.

Another object of the invention is to provide a length of extruded material which has a very high resistance to breaking as a result of repeated flexing.

Another object of the invention is to provide a process of making such a length of extruded material.

It has been known for some time that the extruded products formed from a crystalline type of plastic material have a preferred orientation in the direction of extrusion. Such extruded products are more resistant to tearing transversely than longitudinally but such products are not separable into threads. In other words the micellar alignment of the crystal particles have only a slight preference in the longitudinal direction. It has also been proposed to stretch a preformed film of crystallizable plastic material several hundred percent and then produce threads from the film by rubbing the film transversely to cause it to split into filaments. In this latter case a very great stretch is necessary.

It is an object of the present invention to produce a product which is completely separable into threads or smaller filaments without requiring the added stretching step.

These objects and others ancillary thereto are obtained by adding two or more incompatible thermoplastic, fiber-forming linear-polymeric compositions to an extruding machine and extruding the two materials to form a unitary product.

At least two of the thermoplastic materials which are extruded must be fiber-forming material (i. e., they must be of the type which are capable of giving an X-ray fiber diagram when formed into a thread and stretched) and must be incompatible. Apparently any two of such fiber-forming thermoplastic materials that are incompatible can be employed although it is obvious that the plasticizing temperatures of the two materials should not be too far apart. The proportions of the incompatible materials are not very critical, the proportion of either one can vary from about 5% to 95% or more, of the mixture. The best mixture so far found is 40–60% of cellulose acetate with 60–40% of cellulose acetate butyrate.

The extruded products may have any size from that of textile filaments to large strips or rods. The cross sectional shape of the product can also be varied to suit the application to which the product is to be put. The thin strips are very useful as corset stays and similar stiffening reinforcements for ordinary or protective wearing apparel or in any material which is apt to be subjected to repeated flexing. The mix may be extruded as a rod and twisted to cause the fibrils to extend spirally. The twisted rod may be subsequently flattened.

Various additional ingredients may be added to the mixture as desired. The thermoplastic materials may contain plasticizers and/or pigments, dyes, lubricants, additional plasticizers, etc. may be added to the mix as desired to regulate the color and appearance of the product.

The novel features characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1 is a diagrammatic view illustrating how the product is produced.

Figure 2 is a side view of a length one type of the extruded material showing at one end how the structure can be separated into fibers.

Figure 3 is an end view of the strip of Figure 2.

Figure 4 is an enlarged end view showing diagrammatically the thread-like structure of the strip.

Figure 5 is a view showing what happens when a strip similar to that of Figure 2 is repeatedly flexed.

Figures 6 and 7 illustrate a method of making a product with a spiral thread structure.

As illustrated in Figure 1 the mix comprising two incompatible thread forming thermoplastic materials is extruded through the die 11 of the extruding machine 10 to form a strip 20. The mixture can be forced through the die 11 by any of the ordinary extruding means such as the screw means 12. As shown at the end 21 of Figure 2 the strip 20 can be separated longitudinally into a plurality of threads or filaments. Figure 4 shows diagrammatically how the strip can be separated into threads by applying friction to the end 22' of the strip.

Figure 5 illustrates what happens when a strip made according to the process of Figure 1 is repeatedly flexed back and forth sharply at one transverse area about an angle of almost 360°. The outside surface usually adheres transversely to form a bulging film 23 at the side of the strip. The inner layer of the strip however gradually separates into increasing numbers of thin threads or filaments 24 as the flexing is continued, and the cross-sectional area of the strip increases at the bending area due to the fact that the separated threads are interspersed with air spaces. However, the intermediate layer of threads 24 do not rub against each other or cause abnormal tension to be exerted on any particular area so that the strip will withstand an unusual number of such severe flexings without separating.

The threads may be made to run spirally or non-linearly with respect to the extruded length by a process such as illustrated in Figures 6 and 7. The non-homogeneous mixture of thread forming thermoplastic materials is extruded from the extrusion press 10 through a die 11' which produces a strip or rod 40 of round cross section. The round extrusion product 40 is passed between angled rollers 30, 31 while still plastic so as to twist the extruded product. The twisted rod 40 is cut when the end 41 thereof is so far past the rollers 30, 31 as to tend to untwist. Any method may be employed for twisting the rod 40. The cut lengths of twisted rod are then passed between flattening rollers 32, 33 to produce the strip material 20'. The product shown in Figure 7 separates into threads also when repeatedly flexed but the product is more resistant to splitting than the product of Figures 2–4 because the threads at one of the flat sides of the strip 20 run at an angle to the threads at the oposite side. The outside layers of the product of Figures 6 and 7 is twisted more and is more fibrillar or more easily separated into fibers than the inner layers.

The following example illustrates how the process is carried out.

Example 50 lbs. of commercial cellulose acetate molding powder having a particle size of about 1/8–1/4" in diameter are mixed with an approximately equal amount of commercial cellulose acetate butyrate molding powder of approximately the same particle size. As stated above the ratio of the amount of the two powders is not critical. 1/2 lb. of a pigment such as titanium dioxide is added and the mechanical mixture is introduced into the hopper of a continuous extrusion machine such as shown in Figure 1. The extruded strip has the properties of the strip shown in Figures 2–5 of the drawing. The strip separates substantially completely into threads, i. e., there is no visible portion of the strip which separates into non-fibrous material.

I claim:

1. A process of producing strip material which has a homogeneous appearance but separates into a plurality of filaments when sharply bent comprising the steps of mixing two non-compatible, fiber forming, linear-polymeric, thermoplastic materials, plasticizing said mix, and forcing the mix containing two separate solid phases through a single orifice die and withdrawing the extruded product from the die without substantially stretching the same whereby a unitary product consisting essentially of two distinct series of parallel threads adhered together is obtained.

2. A process of producing strip material which has a homogeneous appearance but separates into a plurality of substantially parallel filaments when sharply bent comprising the steps of mixing cellulose acetate with cellulose acetate butyrate which is non-compatible with said cellulose aceate, plasticizing the mix, and forcing the mix containing two separate solid phases through a die, one phase of said mix comprising a solid fiber-forming material consisting essentially of cellulose acetate and the other phase comprising a solid fiber forming material consisting essentially of cellulose acetate butyrate.

3. A process of producing strip material which has a homogeneous appearance but separates into a plurality of substantially parallel filaments when sharply bent comprising the steps of mixing two non-compatible, fiber forming, linear-polymeric, thermoplastic materials, plasticizing said mix, and forcing the mix containing two distinct solid phases through a die with a circular orifice to form a rod and twisting the extruded rod as it is formed and while it is still in a plastic state and thereafter heating and flattening the twisted rod whereby a unitary product consisting essentially of two distinct series of spirally arranged parallel threads which are adhered together is obtained.

4. As an article of manufacture, an extruded longitudinal strip of thermoplastic material, having a homogeneous appearance but actually comprising two chemically distinct solid phases, each of said phases consisting essentially of a fibrillar, linear-polymeric, thermoplastic material which has a similar melting point but which is incompatible with the thermoplastic material of the other phase even when melted, the linear alignment of the individual fibers of each of said thermoplastic materials being substantially parallel and said strip having a substantial thickness whereby when the strip is bent sharply at any point the phases separate into a plurality of layers each containing a multiplicity of filaments, said product being substantially unseparable transversely thereof beyond the filamentary stage by any operation involving only the repeated bending of the strip.

5. As an article of manufacture, an extruded longitudinal strip of thermoplastic material, having a homogeneous appearance but actually comprising two chemically distinct solid phases, each of said phases consisting essentially of a fibrillar, linear-polymeric, thermoplastic material which has a similar melting point but which is incompatible with the thermoplastic material of the other phase even when melted, the linear alignment of the individual fibers of each of said thermoplastic materials being substantially parallel to the length of the strip and said strip having a substantial thickness whereby when the strip is bent sharply at any point the phases separate into a plurality of layers each containing a multiplicity of filaments, said product being substantially unseparable transversely thereof beyond the filamentary stage by any operation involving only the repeated bending of the strip.

6. As an article of manufacture, an extruded longitudinal strip of thermoplastic material, having a homogeneous appearance but actually comprising two chemically distinct solid phases, each of said phases consisting essentially of a fibrillar, linear-polymeric, thermoplastic material which has a similar melting point but which is incompatible with the thermoplastic material of the other phase even when melted, the linear alignment of the individual fibers of each of said thermoplastic materials being substantially parallel to an imaginary spiral which passes about said strip and said strip having a substantial thickness whereby when the strip is bent sharply at any point the phases separate into a plurality of layers each containing a multiplicity of filaments extending spirally with respect to the length of the said strip, said product being substantially unseparable transversely thereof beyond the filamentary stage by any operation involving only the repeated bending of the strip.

7. As an article of manufacture, an extruded longitudinal strip of thermoplastic material, having a homogeneous appearance but actually comprising two solid phases, one of said phases consisting essentially of cellulose acetate, the other of said phases consisting essentially of cellulose acetate butyrate, said two cellulose derivatives of the two phases being incompatible with each other and each having a fibrillar structure, the linear alignment of the individual fibrils of each of said cellulose derivatives being parallel and said strip having a substantial thickness whereby when the strip is bent sharply at any point the phases separate into a plurality of layers each containing a multiplicity of filaments said product being substantially unseparable transversely thereof by any operation involving only the repeated bending of the strip.

PETER H. SECKEL.

REFERENCES CITED

The following references are of record in the file of this patent:

UNITED STATES PATENTS

| Number | Name | Date |
|---|---|---|
| 2,185,789 | Jacque | Jan. 2, 1940 |
| 2,223,376 | Malm | Dec. 3, 1940 |
| 2,251,962 | Sommaripa | Aug. 12, 1941 |
| 2,353,457 | Goessling | July 11, 1944 |

OTHER REFERENCES

Bailey: "Plastics Technology," India Rubber World, May 1948, pages 225–231.